(12) United States Patent
Takahashi et al.

(10) Patent No.: US 7,134,702 B2
(45) Date of Patent: Nov. 14, 2006

(54) STRUCTURE FOR SUPPORTING HEADLAMPS FOR VEHICLE

(75) Inventors: Shinji Takahashi, Saitama (JP); Tomoko Nagamatsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 10/947,181

(22) Filed: Sep. 23, 2004

(65) Prior Publication Data

US 2005/0117359 A1    Jun. 2, 2005

(30) Foreign Application Priority Data

Sep. 30, 2003   (JP) ............................. 2003-339740

(51) Int. Cl.
*B60R 9/00*    (2006.01)

(52) U.S. Cl. .................................... 296/37.1; 224/401

(58) Field of Classification Search ............... 296/37.1; 224/401, 452, 42.11, 539
See application file for complete search history.

(56) References Cited

U.S. PATENT DOCUMENTS

| 6,016,943 A * | 1/2000 | Johnson et al. ............. 224/401 |
| 6,523,634 B1 * | 2/2003 | Gagnon et al. ............. 180/291 |
| 6,705,680 B1 * | 3/2004 | Bombardier ............. 298/17 R |

FOREIGN PATENT DOCUMENTS

JP           63-115844 U       7/1988

* cited by examiner

*Primary Examiner*—Joseph D. Pape
(74) *Attorney, Agent, or Firm*—Birch, Stewart, Kolasch & Birch, LLP

(57) ABSTRACT

A support structure for headlamps of a vehicle is provided which simplifies the required number of components while simultaneously providing adequate support strength for the headlamps. A vehicle body frame is covered with a front cover. The front cover covers left and right front wheels with left and right fender portions integrally provided with the front cover. A cargo carrier capable of holding luggage or other cargo is positioned above the front cover and is supported by a carrier stay. The headlamps are arranged next to the carrier stay and fender portions, and are directly supported by the fender portions and the carrier stay.

19 Claims, 6 Drawing Sheets

US 7,134,702 B2

STRUCTURE FOR SUPPORTING HEADLAMPS FOR VEHICLE

BACKGROUND OF THE INVENTION

CROSS-REFERENCES TO RELATED APPLICATIONS

This nonprovisional application claims priority under 35 U.S.C. § 119(a) on Patent Application No. 2003-339740 filed in Japan on Sep. 30, 2003, the entirety of which is hereby incorporated by reference.

FIELD OF THE INVENTION

The present invention relates to a structure for supporting headlamps for a vehicle, and more particularly to a structure capable of providing adequate support strength while simultaneously simplifying the structure.

DESCRIPTION OF THE BACKGROUND ART

In the support structure for vehicle headlamps of the background art, the headlamp typically faces the front side of a fender and is supported by a structural body such as the fender, a carrier or a carrier stay (carrier pipe) for supporting the carrier.

In the structure for supporting headlamps for a vehicle, a front grille has been provided in front of the fender. The front grille is then provided with an opening and the headlamp has been caused to face outwardly toward this opening. In this type of structure for supporting headlamps, one example of the background art incorporates a headlamp that has been arranged in front of the fender, e.g., Japanese Utility Model Laid-Open No. 63-115844 (see P. 1, FIG. 1 of this reference), the entirety of which is hereby incorporated by reference.

FIG. 6 is a partial, perspective view of a vehicle showing the basic structure of a support structure for a headlamp of the background art. The structure 200 for supporting headlamps for the vehicle described in the Japanese Utility Model Laid-Open No. 63-115844 is arranged such that headlamps 202, 202 are arranged in front of the left and right fender portions 201, 201, and these headlamps 202, 202 are protected by guard portions 204, 204 extending from the carrier 203.

However, in the structure 200 for supporting headlamps for the vehicle described hereinabove, since the left and right fender portions 201, 201 support the headlamps 202, 202, it is necessary to use reinforcement members in portions for supporting the headlamps 202, 202. Also, in the structure 200 for supporting headlamps for the vehicle described hereinabove, if an attempt is made to support the headlamps 202, 202 by, for example, the carrier 203 or a carrier stay (not shown) for supporting the carrier 203, it will be necessary to separately provide members for supporting these headlamps 202, 202. In this case, the number of required parts will be increased and the structure will become more complicated and heavier.

The present inventors have determined that it would be advantageous to improve the structure of the background art by maintaining the desired support strength for the headlamp while simplifying the structure by making effective use of existing component members.

SUMMARY OF THE INVENTION

The present invention overcomes the shortcomings associated with the background art and achieves other advantages not realized by the background art.

An object of the present invention is to solve one or more problems associated with the structure of the background art.

An object of the present invention is to improve the structure of the background art by maintaining the desired support strength for a headlamp while simplifying the support structure by making effective use of existing component members.

One or more of these and other objects are accomplished by a vehicle comprising a vehicle body frame being covered by a vehicle body cover; left and right wheels operatively connected to the vehicle body frame, wherein the left and right wheels are covered by left and right fender portions; a cargo carrier being positioned above the body cover, wherein the carrier is supported by a carrier stay; and a left headlamp and a right headlamp, wherein the right and left headlamps are positioned in locations adjacent to the carrier stay and the left and right fender portions, respectively, and the carrier stay and the fender portions directly support the respective left and right headlamps.

One or more of these and other objects are accomplished by a headlamp support structure for a vehicle, the headlamp support structure comprising a vehicle body frame being covered by a vehicle body cover; left and right fender portions; a cargo carrier being positioned above the body cover, wherein the carrier is supported by a carrier stay; and a left headlamp and a right headlamp, wherein the right and left headlamps are positioned in locations adjacent to the carrier stay and the left and right fender portions, respectively, and the carrier stay and the fender portions directly support the respective left and right headlamps.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
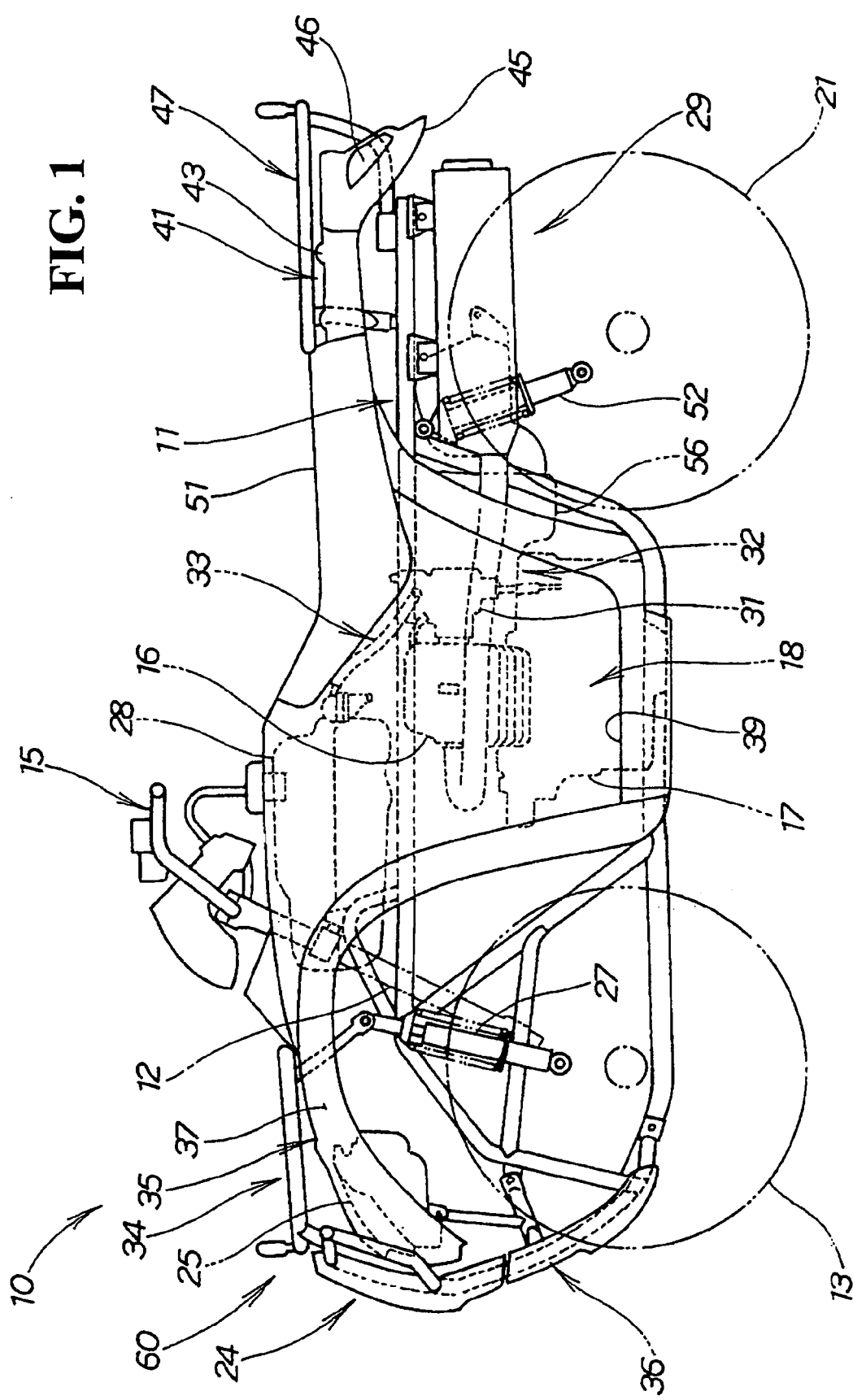
FIG. 1 is a side view showing a vehicle having the structure for supporting headlamps according to an embodiment of the present invention.
Figure 2:
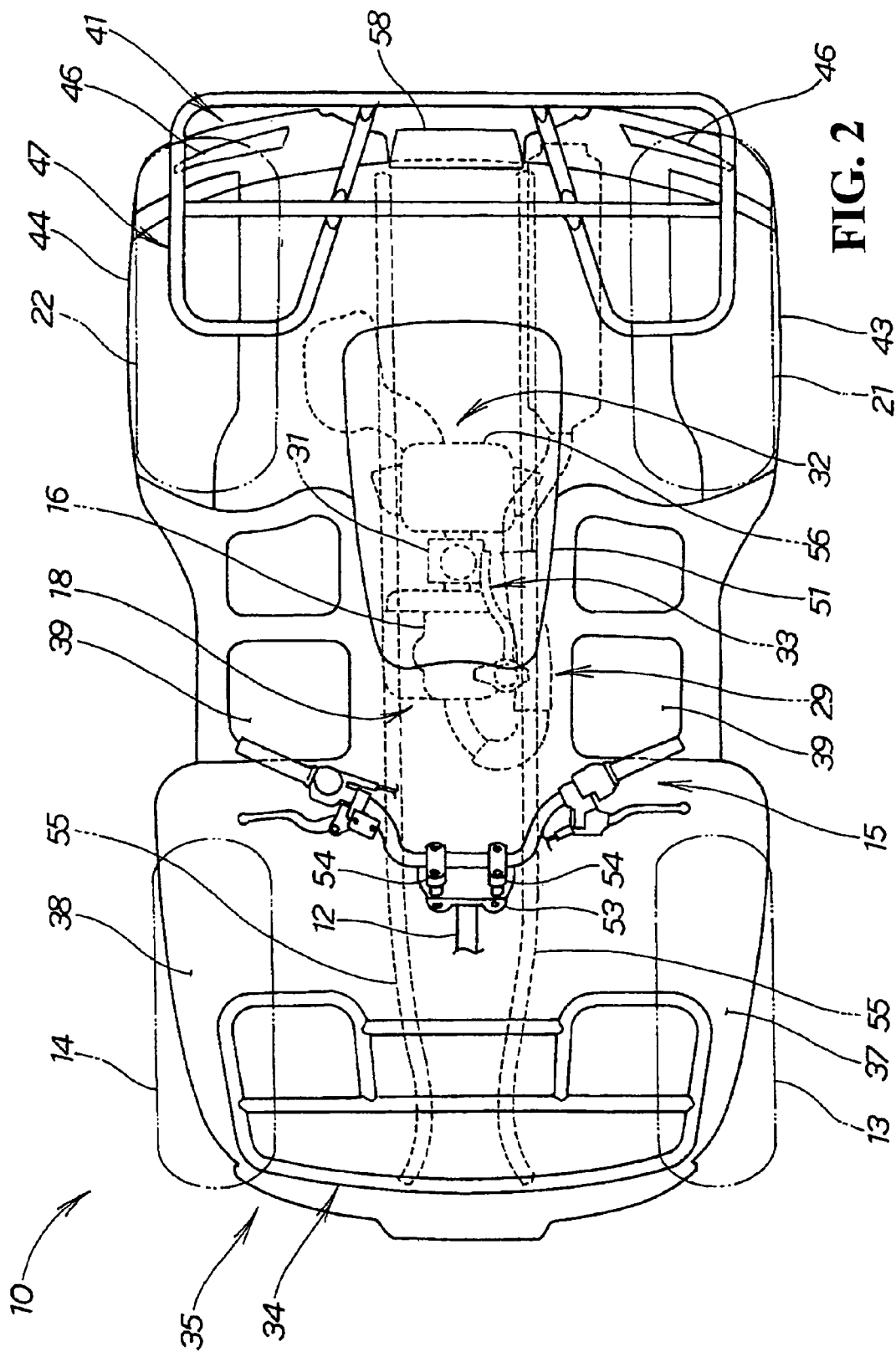
FIG. 2 is a plan view showing a vehicle having the structure for supporting headlamps according to an embodiment of the present invention.
Figure 3:
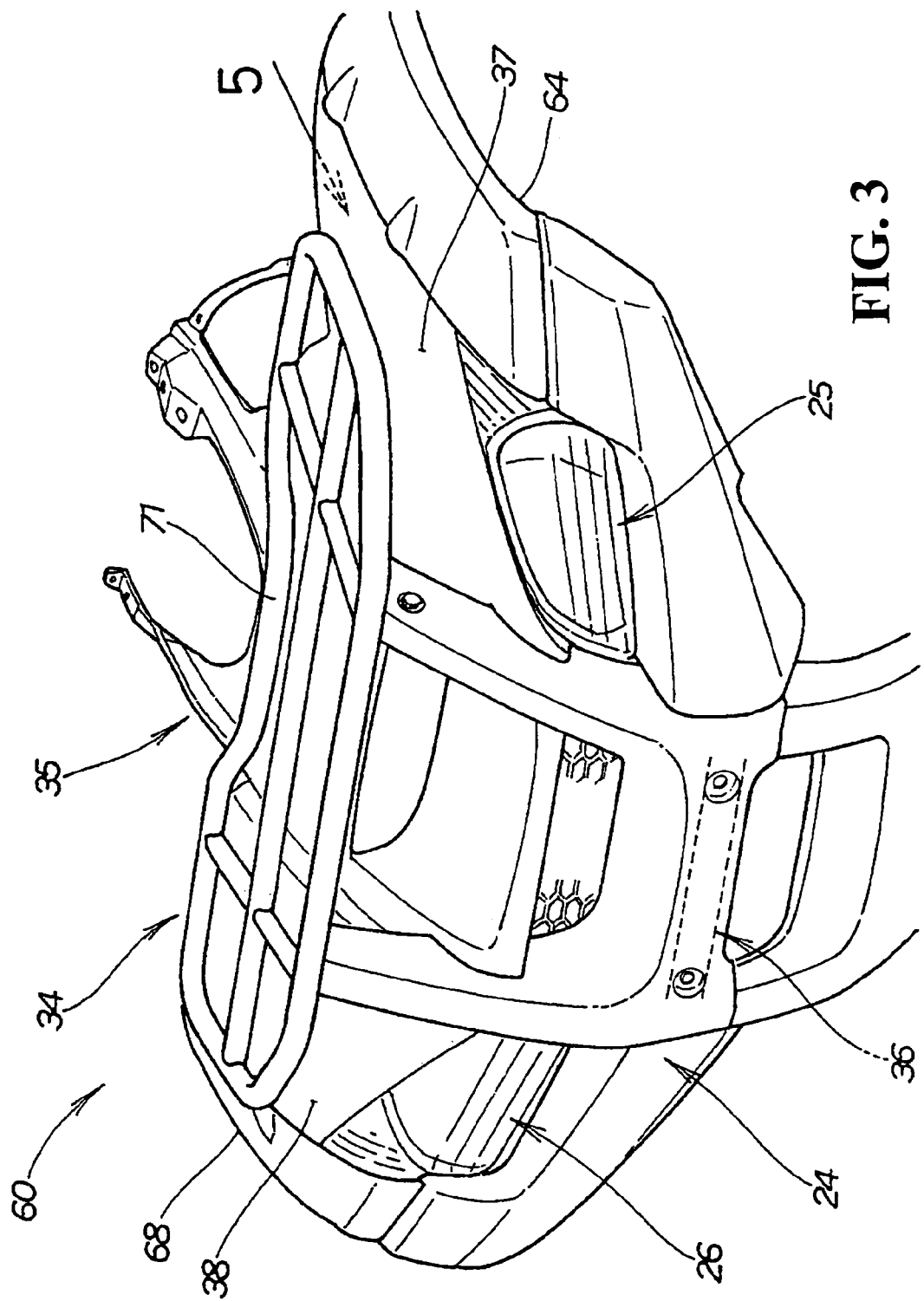
FIG. 3 is a perspective view showing the front part of a vehicle having the structure for supporting headlamps according to an embodiment of the present invention.
Figure 4:
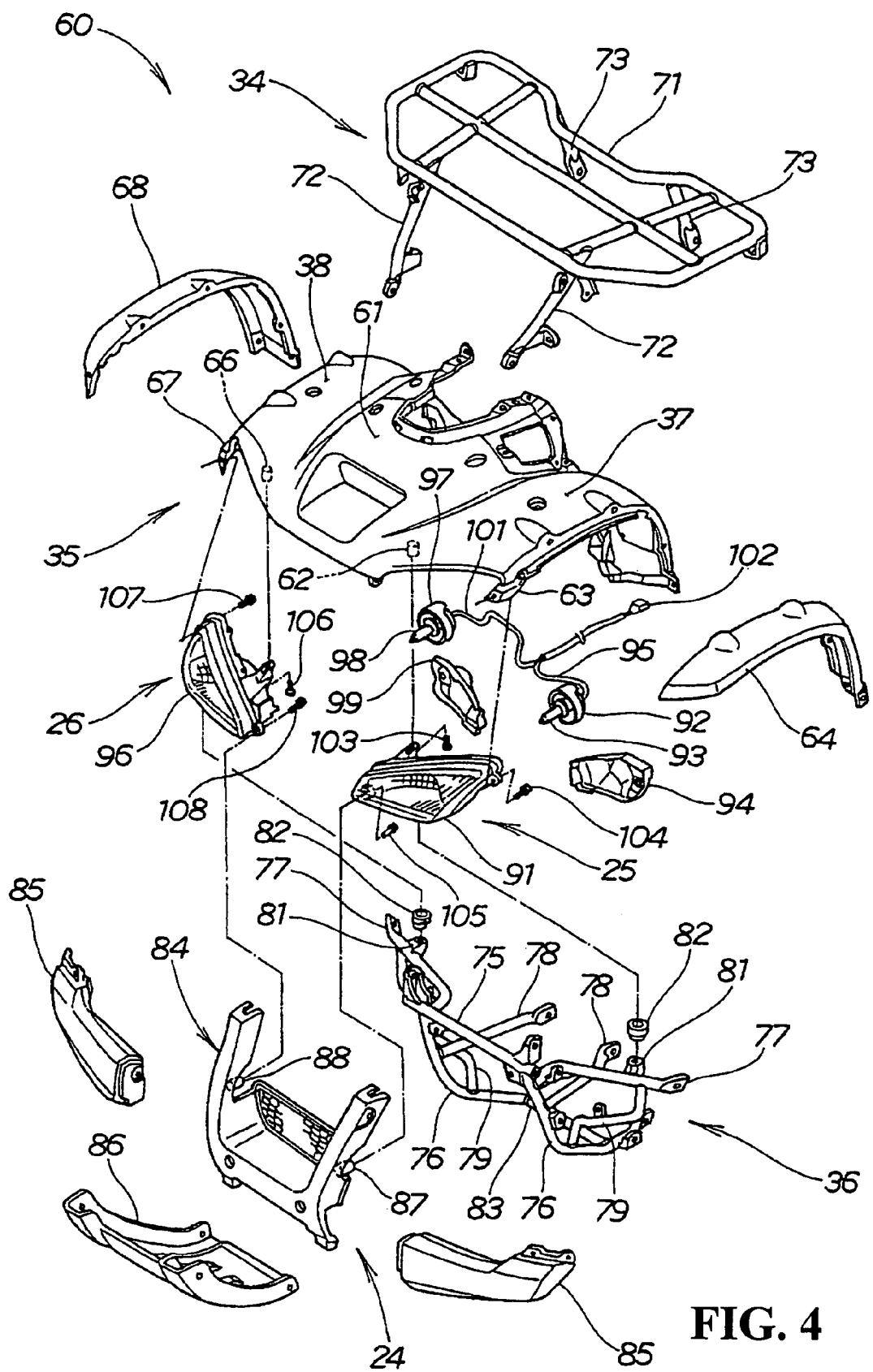
FIG. 4 is an exploded perspective view showing the structure for supporting headlamps for a vehicle according to an embodiment of the present invention.
Figure 5:
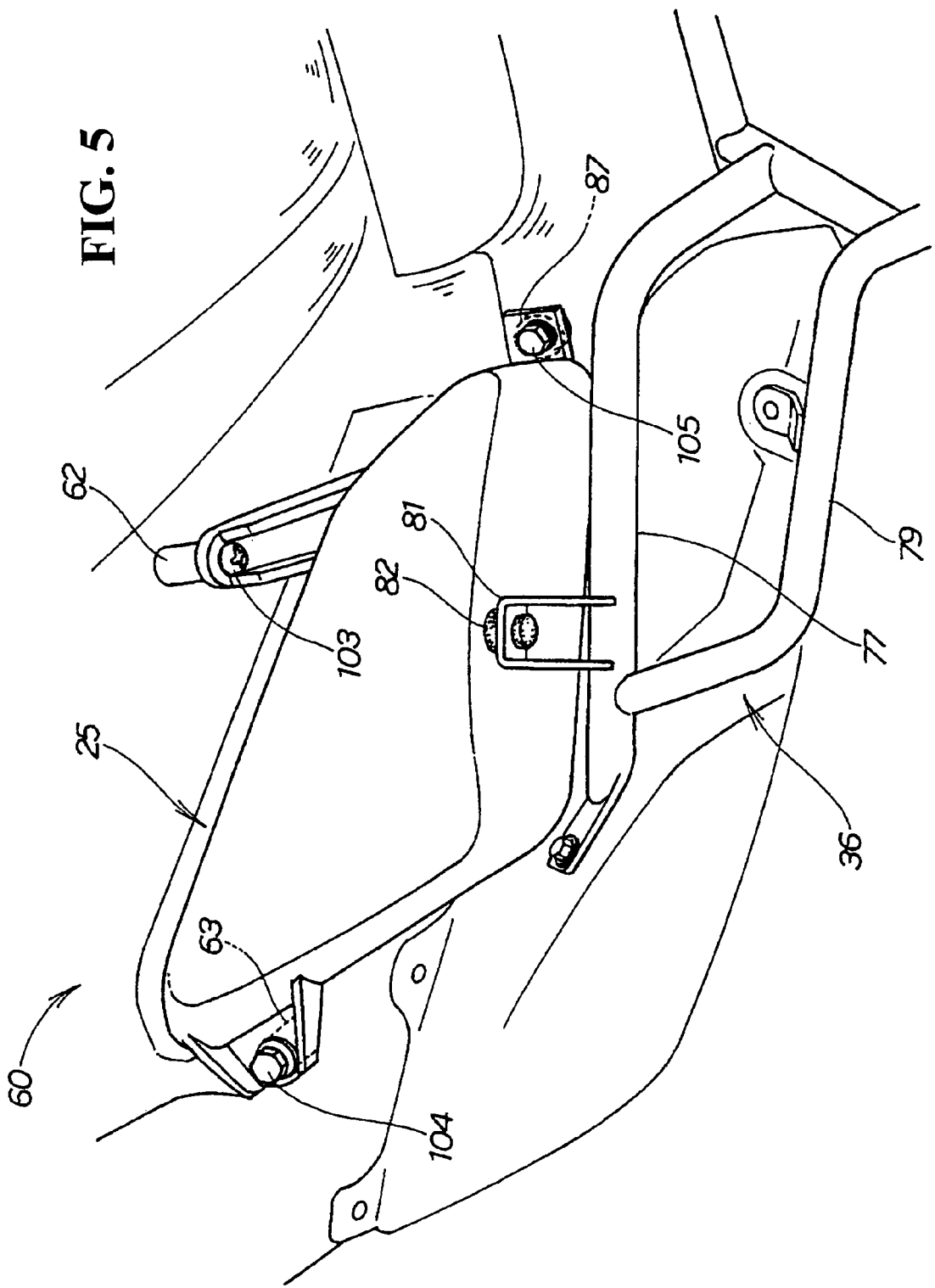
FIG. 5 is a side view taken along the direction of arrow 5 in FIG. 3.
Figure 6:
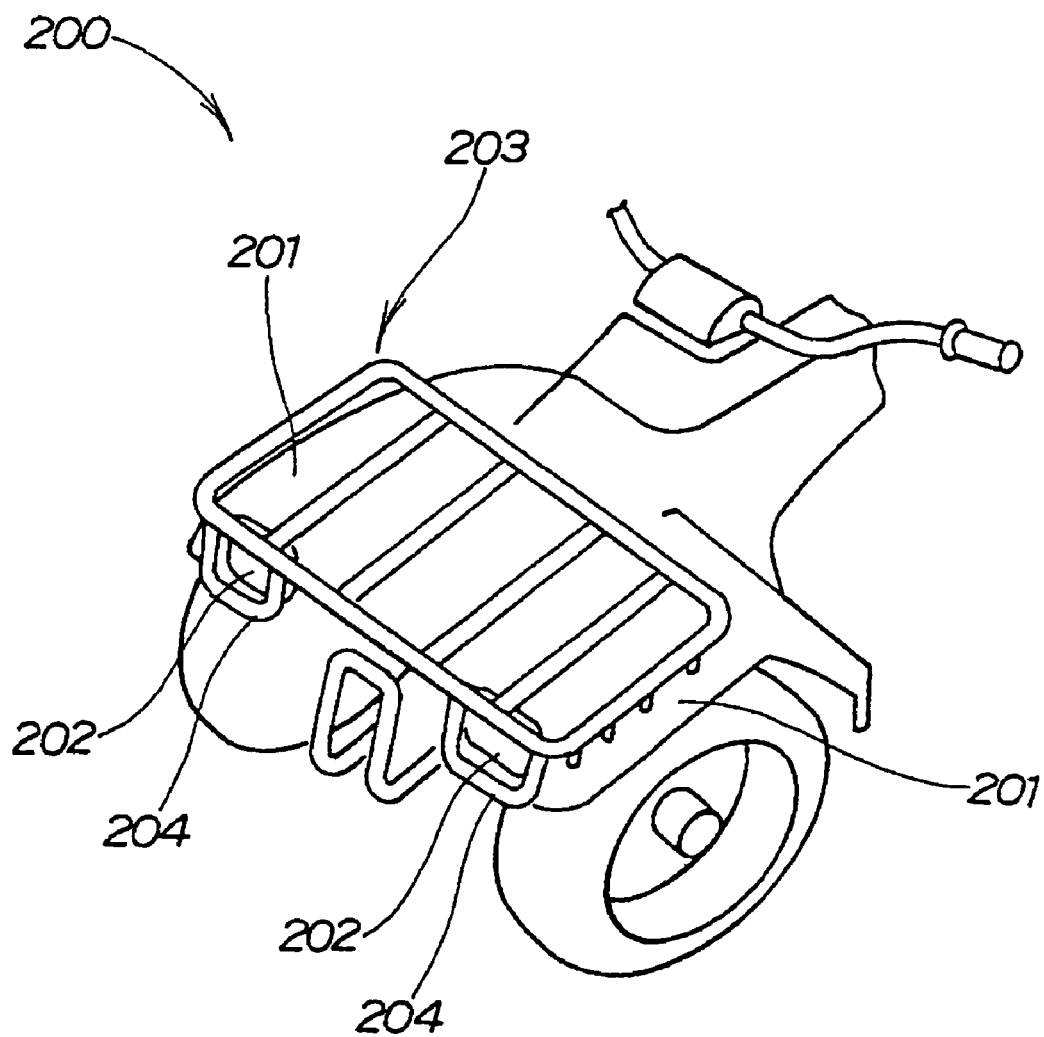
FIG. 6 is a partial, perspective view of a vehicle showing the basic structure of a support structure for a headlamp of the background art.

The present invention will hereinafter be described with reference to the accompanying drawings. The drawings should be viewed in a direction that permits a normal orientation of the reference numerals. FIG. 1 is a side view showing a vehicle having the structure for supporting headlamps according to an embodiment of the present invention. FIG. 2 is a plan view showing a vehicle having the structure for supporting headlamps according to an embodiment of the present invention. FIG. 3 is a perspective view showing the front part of a vehicle having the structure for supporting headlamps according to an embodiment of the present invention. FIG. 4 is an exploded perspective view showing the structure for supporting headlamps for a vehicle according to an embodiment of the present invention. FIG. 5 is a side view taken along the direction of arrow 5 in FIG. 3.

In FIG. 1, a vehicle 10, such as an all-terrain vehicle for operation on uneven land or for off-road applications, is shown which includes a steering shaft 12 installed in front of a body frame 11. A lower end portion side of this steering shaft 12 is coupled to left and right front wheels 13, 14 (only the front wheel 13 on this side is shown). On the upper end side of the steering shaft 12, a handlebar 15 is installed and in the intermediate part of the body frame 11, a power unit 18 is installed which includes an engine 16 and a transmission 17. Rear wheels 21, 22 (only the rear wheel 21 on this side is shown) are provided on the rear side of the body frame 11 and are driven by the power unit 18 together with the front wheels 13, 14.

In this case, a front grille 24 for covering the front surface of the vehicle body is also provided along with headlamps 25, 26 (only the reference numeral 25 on this side is shown). A shock absorber 27, 27 (only one reference numeral is shown) is also provided for each of the front wheels 13, 14. A fuel tank 28 is installed on the body frame 11 and an exhaust device 29 is operatively connected to the front part of the engine 16 and bent at a portion for extending rearward. A carburetor 31 is connected to the rear part of the engine 16 and an air cleaner 32 is coupled to the rear part of the carburetor 31. An air vent device 33 for exerting atmospheric pressure on the fuel fluid surface in a float chamber is also provided within the carburetor 31.

The vehicle 10 is also provided with a front carrier 34, e.g., a carrier on which luggage or cargo is placed, a front cover 34 serving as a body cover for covering the front part of the vehicle body, and a carrier stay 36 (carrier pipe) is installed on the body frame 11. Left and right fender 37, 38 portions (only the reference numeral 37 on this side is shown) for covering the upper part and the rear part of the front wheels 13, 14 are integrally formed on the front cover 35. A step 39, 39 is provided (only the reference numeral 39 on this side is shown) on each side of the vehicle 10 on which the driver puts his feet. A rear cover 41 is provided for covering the rear part of the vehicle body and left and right rear fender portions 43, 44 (only the reference numeral 39 on this side is shown) for covering the front part and the upper part of the rear wheels 21, 22 are formed on the rear cover 41.

Mud guards 45, 45 (only the reference numeral 45 on this side is shown) are installed on the rear fender portions 43, 44 respectively and tail lamps 46, 46 (only the reference numeral 46 on this side is shown) are installed on the mud guards 45, 45 respectively. A rear carrier 47 may be provided above the rear cover and rear fender portions 43, 44. A seat 51 and shock absorbers 52, 52 (only the reference numeral 52 on this side is shown) for the rear wheels 21, 22 are also provided on the vehicle 10.

FIG. 2 is a plan view showing a vehicle having the structure for supporting the headlamps according to an embodiment of the present invention. Left and right main frames 55, 55 for constituting one part of the body frame 11 are arranged in the central part of the vehicle body so as to extend in a longitudinal direction, and between these main frames 55, 55, there are arranged the power unit 18, the carburetor 40 and a main air cleaner 56 for constituting the air cleaner 32. The exhaust device 29 is bent in an U-shape from the engine 16 and extends rearward therefrom.

FIG. 2 also shows a handlebar supporting member 53 installed on the upper part of the steering shaft 12. The handlebar 15 is installed on the handlebar supporting member 53 via handlebar sandwiching members 54, 54, and further shows that mud guards 45, 45 are arranged at the left and right of the vehicle body with a license plate 58 sandwiched therebetween.

FIG. 3 is a perspective view showing the front part of a vehicle having the structure for supporting the headlamps according to an embodiment of the present invention. Structure 60 for supporting the headlamps includes the front cover 35 for covering the front part of the vehicle body; the left and right fender portions 37, 38 for covering the front wheels 13, 14 (see FIG. 2) which are formed integrally with the front cover 35, and a front carrier 34 for loading the luggage is provided on the upper parts of the front cover 35 and left and right fender portions 37, 38. The carrier stay (carrier pipe) 36 is provided for supporting the front carrier 34 and serves as a front bumper. The front grille 24 covers the front surface of the carrier stay 36, and the left and right headlamps 25, 26 are installed to the front grille 24 and left and right fender portions 37, 38 and are supported by the carrier stay 36.

FIG. 4 is an exploded perspective view showing structure for supporting headlamps for a vehicle according to an embodiment of the present invention. The front cover 35 is a member in which the body portion 61 has been formed with the left and right fender portions 37, 38. The left fender portion 37 includes the center-side installation boss 62 for installing the left headlamp 25, the edge-side installation boss 63 for installing the left headlamp 25, and the left over-fender 64 for covering the outward portion of the left front wheel 13 by extending in a direction of the vehicle width.

The right fender portion 38 includes the center-side installation boss 66 for installing the right headlamp 26, the edge-side installation boss 67 for installing the right headlamp 26; and the right over-fender 68 for covering the outward portion of the right front wheel 14 by extending in a direction of the vehicle width.

The front carrier 34 is a member which is formed by pipes, and includes a loading portion 71 for loading the luggage, front pipes 72, 72 coupled to the carrier stay 36 and extending downward from the front of this loading portion 71, and rear pipes 73, 73 coupled to the body frame 11 (See FIG. 1) side and extending downward from the rear of the loading portion 71.

The carrier stay (carrier pipe) 36 is a member formed with pipes as in the case of the front carrier 34, and includes a cross pipe 75, left and right down pipes 76, 76 for extending from both ends of this cross pipe 75 obliquely backward, left and right first extending pipes 77, 77 for extending from the front ends of these left and right down pipes 76, 76 rearward respectively, left and right second extending pipes 78, 78 for extending from intermediate parts of the left and right down pipes 76, 76 rearward respectively, and left and right stay pipes 79, 79 for connecting the left and right down pipes 76, 76 to the left and right first extending pipes 77, 77 respectively. Left and right headlamp reception portions 81, 81 are provided at connected portions between the left and right stay pipes 79, 79 and left and right down pipes 76, 76 respectively. Elastic members 82, 82 are provided at the headlamp reception portions 81, 81 respectively, and a rear cross pipe 83 connects the rear portions of the left and right down pipes 76, 76 together.

The front grille 24 is constructed with a grill body portion 84, left and right horizontal portions 85, 85 extending to the left and right of the grill body portion 84 respectively; and a guard portion 86 for covering the lower part of the carrier stay 36 by extending below the grill body portion 84. The grille body portion 84 includes left and right installation bosses 87, 88 for installing the left and right headlamps 25, 26.

The left headlamp 25 includes a left lens portion 91 installed to the left fender portion 37, a socket portion 92 installed from behind the lens portion 91, a bulb 93 inserted into the socket portion 92, and a cover 94 for covering the socket portion 92, and a left harness 95 for extending from this socket portion. The right headlamp 26 is a member having the same structure as the left headlamp 25 and a symmetrical shape thereto. A right lens portion 96, a socket portion 97, a bulb 98, a cover 99, and a right harness 101 are also provided. The left and right harnesses 95, 101 are obtained by tying up the harnesses into a bundle at the rear end for connecting to the connector 102.

In FIG. 4, a screw 103 for installing the left lens portion 91 to the center-side installation boss 62, a bolt 104 for installing the left lens portion 91 to the edge-side installation boss 63, a bolt 105 for installing the left lens portion 91 to the left installation boss 87 of the grille body portion 84, a screw 106 for installing the right lens portion 96 to the center-side installation boss 66, a bolt 107 for installing the right lens portion 96 to the edge-side installation boss 67, and a bolt 108 for installing the right lens portion 96 to the right installation boss 88 of the grille body portion 84 are provided as shown.

FIG. 5 is view taken along the direction of arrow 5 in FIG. 3. Structure 60 for supporting headlamps for a vehicle 10 wherein left and right front wheels (wheels) 13, 14 shown in FIG. 2 are installed to the body frame 11 in such a manner as to be freely rotatable. The body frame 11 is covered with the front cover (body cover) 35, and the left and right front wheels 13, 14 are covered by integrally providing the front cover 35 with left and right fender portions 37, 38 (38 is not shown). A front cargo carrier (carrier) 34 capable of loading luggage is arranged above the front cover 35. The front carrier 34 is supported by the carrier stay (carrier pipe) 36, and around these carrier stay 36 and fender portions 37, 38, headlamps 25, 26 (26 is not shown) are arranged. The headlamps 25, 26 are installed to the fender portions 37, 38 and are supported by the carrier stay 36, to be thereby supported by both the fender portions 37, 38 and the carrier stay 36.

The present inventors have determined that if the supporting strength of the headlamps could be enhanced by making effective use of the existing component members and the like, the structure for supporting the headlamps can be simplified. Accordingly, by installing the headlamps to the fender portion and supporting the headlamps with the carrier stay, the headlamps can be supported by both the fender portion and the carrier stay.

By installing the headlamp 25 to the fender portion 37 and supporting the headlamps with the carrier stay 36, it is possible to make effective use of the existing component members to secure the required supporting strength for the headlamp 25 without making the structure complicated. The structure 60 for supporting headlamps for the vehicle can include the lower part of the headlamp 25, 26 (26 is not shown) elastically supported by the carrier stay 36 via elastic members 82, 82 (one 82 is not shown). Accordingly, the lower part of the headlamp 25 is elastically supported by the carrier stay 36, whereby the assembling property of the headlamp 25 can be improved.

Although the left and right fender portions 37, 38 have been formed integrally with the front cover 35 as shown in FIG. 3, the structure is not limited thereto. Alternatively, the left and right fender portions 37, 38 may be formed separately and may be installed to the front cover. One of skill in the art will appreciate that the present invention is applicable to many types of vehicles, but the structure for supporting headlamps for a vehicle according to a preferred embodiment of the present invention is applied to a vehicle for driving on uneven land, e.g., such as a four-wheeled all terrain vehicle.

If the lower part of the headlamp has been elastically supported by the carrier stay as described hereinabove, the lower part of the headlamp is elastically supported by the carrier stay, and the ease of assembly of the headlamp can be improved. If the headlamp has been installed to the fender portion and has also been supported by the carrier stay, it is possible to make effective use of the existing component members of the vehicle to secure adequate support strength for the headlamp without making the structure unduly complicated. As a result, there is an advantage that the required support structure can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
   a vehicle body frame being covered by a vehicle body cover;
   left and right wheels operatively connected to the vehicle body frame, wherein said left and right wheels are covered by left and right fender portions;
   a cargo carrier being positioned above said body cover, wherein said carrier is supported by a carrier stay; and
   a left headlamp and a right headlamp, wherein said right and left headlamps are positioned in locations adjacent to the carrier stay and the left and right fender portions, respectively, and said carrier stay and said fender portions directly support the respective left and right headlamps.

2. The vehicle according to claim 1, wherein a lower part of each of said headlamps is elastically supported by said carrier stay.

3. The vehicle according to claim 1, further comprising a front grille covering a front surface of the vehicle body and in a position adjacent to said left and right headlamp.

4. The vehicle according to claim 2, further comprising a front grille covering a front surface of the vehicle body and in a position adjacent to said left and right headlamp.

5. The vehicle according to claim 1, wherein the carrier stay is a front bumper for said vehicle.

6. The vehicle according to claim 1, wherein the left and right fender portions are integrally formed as a single piece with said front cover.

7. The vehicle according to claim 1, wherein the left and right fender portions are integrally formed as separate pieces operatively connected with said front cover.

8. The vehicle according to claim 4, wherein the carrier stay is a front bumper for said vehicle.

9. The vehicle according to claim 8, wherein the left and right fender portions are integrally formed as a single piece with said front cover.

10. The vehicle according to claim 8, wherein the left and right fender portions are integrally formed as separate pieces operatively connected with said front cover.

11. The vehicle according to claim 1, wherein the left fender portion includes a pair of installation bosses for connecting said left headlamp to said left fender portion and the right fender portion includes a pair of installation bosses for connecting said right headlamp to said left fender portion.

12. The vehicle according to claim 10, wherein the left fender portion includes a pair of installation bosses for connecting said left headlamp to said left fender portion and the right fender portion includes a pair of installation bosses for connecting said right headlamp to said left fender portion.

13. The vehicle according to claim 1, wherein the cargo carrier is formed by a plurality of pipes, said plurality of pipes including
a loading portion for loading cargo,
front pipes coupled to the carrier stay and extending downward from a front side of the loading portion, and
rear pipes coupled to the vehicle body frame and extending downward from a rear side of the loading portion.

14. The vehicle according to claim 12, wherein the cargo carrier is formed by a plurality of pipes, said plurality of pipes including
a loading portion for loading cargo,
front pipes coupled to the carrier stay and extending downward from a front side of the loading portion, and
rear pipes coupled to the vehicle body frame and extending downward from a rear side of the loading portion.

15. The vehicle according to claim 1, wherein the carrier stay further includes
a cross pipe,
left and right down pipes extending from both ends of the cross pipe obliquely rearward,
left and right first extending pipes extending from front ends of the left and right down pipes rearward, respectively,
left and right second extending pipes extending from intermediate parts of the left and right down pipes rearward, respectively, and
left and right stay pipes connecting the left and right down pipes to the left and right first extending pipes, respectively.

16. The vehicle according to claim 15, wherein the carrier stay further includes left and right headlamp reception portions provided at connected portions between the left and right stay pipes and left and right down pipes.

17. The vehicle according to claim 14, wherein the carrier stay further includes
a cross pipe,
left and right down pipes extending from both ends of the cross pipe obliquely rearward,
left and right first extending pipes extending from front ends of the left and right down pipes rearward, respectively,
left and right second extending pipes extending from intermediate parts of the left and right down pipes rearward, respectively, and
left and right stay pipes connecting the left and right down pipes to the left and right first extending pipes, respectively.

18. The vehicle according to claim 17, wherein the carrier stay further includes left and right headlamp reception portions provided at connected portions between the left and right stay pipes and left and right down pipes.

19. A headlamp support structure for a vehicle, said headlamp support structure comprising:
a vehicle body frame being covered by a vehicle body cover;
left and right fender portions;
a cargo carrier being positioned above said body cover, wherein said carrier is supported by a carrier stay; and
a left headlamp and a right headlamp, wherein said right and left headlamps are positioned in locations adjacent to the carrier stay and the left and right fender portions, respectively, and said carrier stay and said fender portions directly support the respective left and right headlamps.

* * * * *